(12) United States Patent
Rögl et al.

(10) Patent No.: US 7,812,099 B2
(45) Date of Patent: Oct. 12, 2010

(54) PROCESS FOR PREPARING A BLOCK COPOLYMER FROM POLYIMIDES AND USE OF THE BLOCK COPOLYMER FOR PRODUCING POWDERS AND MOULDINGS

(75) Inventors: Harald Rögl, Wallern an der (AT); Markus Ungerank, Perg (AT)

(73) Assignee: Evonik Fibres GmbH, Lenzing (AT)

( * ) Notice: Subject to any disclaimer, the term of this patent is extended or adjusted under 35 U.S.C. 154(b) by 127 days.

(21) Appl. No.: 11/989,032

(22) PCT Filed: Jul. 13, 2006

(86) PCT No.: PCT/EP2006/006840

§ 371 (c)(1),
(2), (4) Date: Jan. 18, 2008

(87) PCT Pub. No.: WO2007/009652

PCT Pub. Date: Jan. 25, 2007

(65) Prior Publication Data

US 2009/0143541 A1 Jun. 4, 2009

(30) Foreign Application Priority Data

Jul. 22, 2005 (DE) .................. 10 2005 034 969

(51) Int. Cl.
*C08L 77/00* (2006.01)
(52) U.S. Cl. .................. 525/432; 427/222; 524/600; 524/775; 524/879; 528/353
(58) Field of Classification Search .................. 525/89, 525/250, 271, 314, 420, 432, 435; 526/173; 528/353
See application file for complete search history.

(56) References Cited

U.S. PATENT DOCUMENTS

| | | | | |
|---|---|---|---|---|
| 3,422,061 | A | | 1/1969 | Gall |
| 3,933,745 | A | | 1/1976 | Bargain et al. |
| 4,413,117 | A | * | 11/1983 | Reiter et al. ............ 528/497 |
| 4,755,428 | A | * | 7/1988 | Noda et al. ............ 428/402 |
| 4,923,954 | A | | 5/1990 | Klobucar et al. |
| 5,179,153 | A | * | 1/1993 | George ............ 524/495 |
| 5,718,855 | A | * | 2/1998 | Akahori et al. ............ 264/122 |
| 5,773,559 | A | * | 6/1998 | Miyamoto et al. ............ 528/353 |

FOREIGN PATENT DOCUMENTS

| | | |
|---|---|---|
| DE | 2252635 | 10/1972 |
| DE | 693 24 662 T 2 | 4/1999 |
| EP | 0 068 246 B1 | 1/1983 |
| EP | 0 260 709 B1 | 3/1988 |
| EP | 0 337 355 B1 | 1/1995 |
| EP | 0 479 148 B1 | 8/1996 |
| EP | 0604 319 B1 | 4/1999 |
| EP | 0 725 302 B1 | 4/2002 |
| JP | 5025274 | 2/1993 |
| JP | 8100061 | 4/1996 |

* cited by examiner

*Primary Examiner*—David Wu
*Assistant Examiner*—Robert Jones, Jr.
(74) *Attorney, Agent, or Firm*—Hamilton, Brook, Smith & Reynolds, P.C.

(57) ABSTRACT

The invention describes a process for preparing pulverulent polyimide-polyimide block copolymers. The result polyimide-polyimide block copolymers and compounds produced using them can be compressed into moldings by the direct forming method or by the hot compression molding method. Polymeric moldings can be produced therefrom by customary mechanical and thermal machining and forming methods.

11 Claims, 4 Drawing Sheets

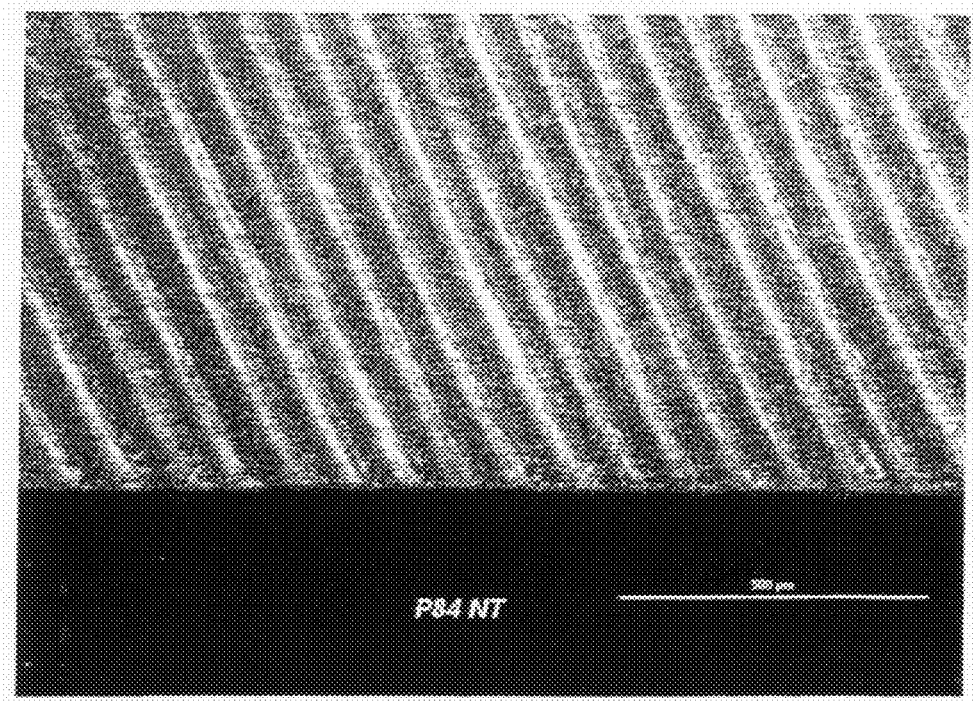
Figure 1: Face side and edge of a surface subjected to mechanical working by means of turning on a moulding produced from a polymer obtained according to the process of the invention

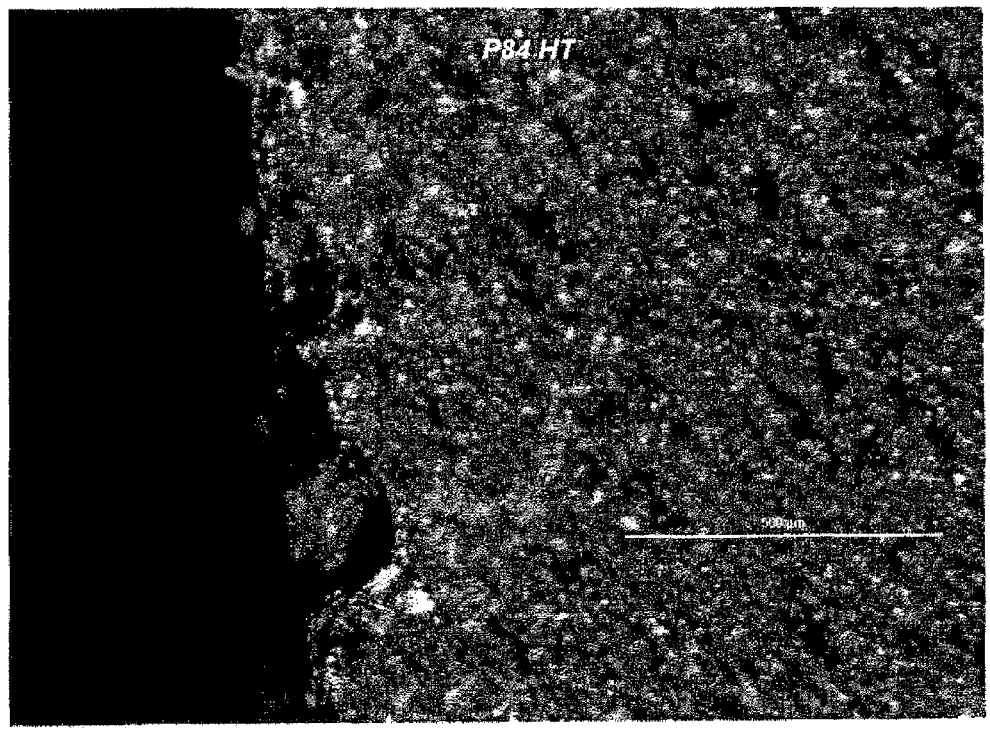
Figure 2: Face side and edge of a surface subjected to mechanical working by means of turning on a moulding produced from SINTIMID® (a high-performance polyimide-based plastic) (P84 HT);

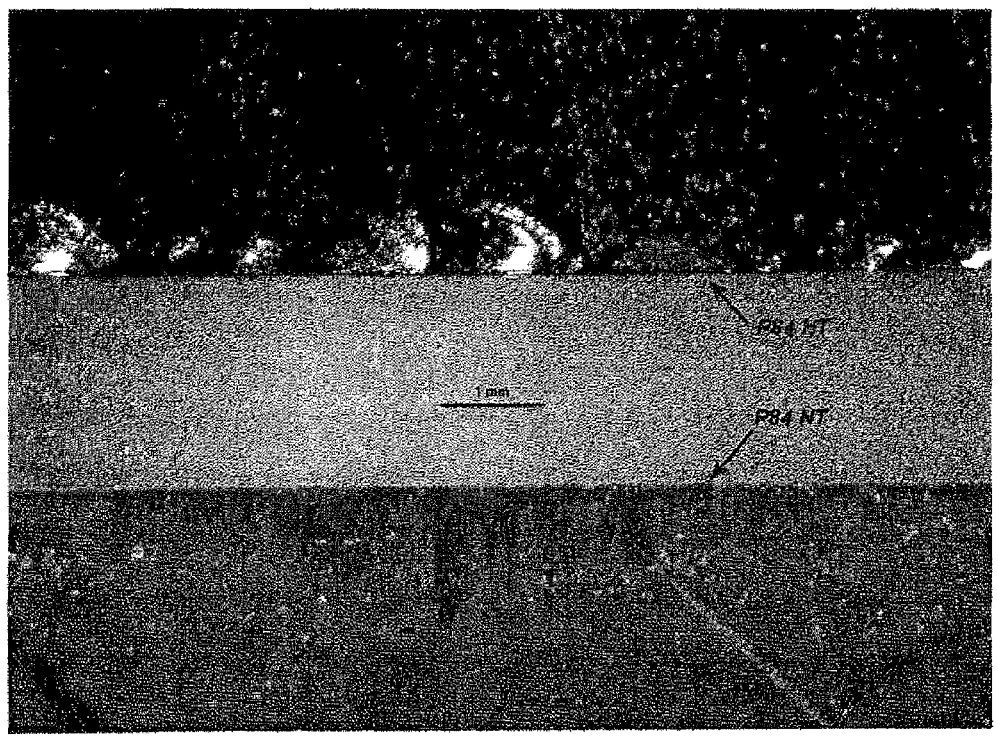
Figure 3: Surface and edge of a surface subjected to mechanical working by means of milling on a moulding produced from a polymer obtained according to the process of the invention (P84 NT, below) and SINTIMID® (a high-performance polyimide-based plastic) (P84 HT, above)

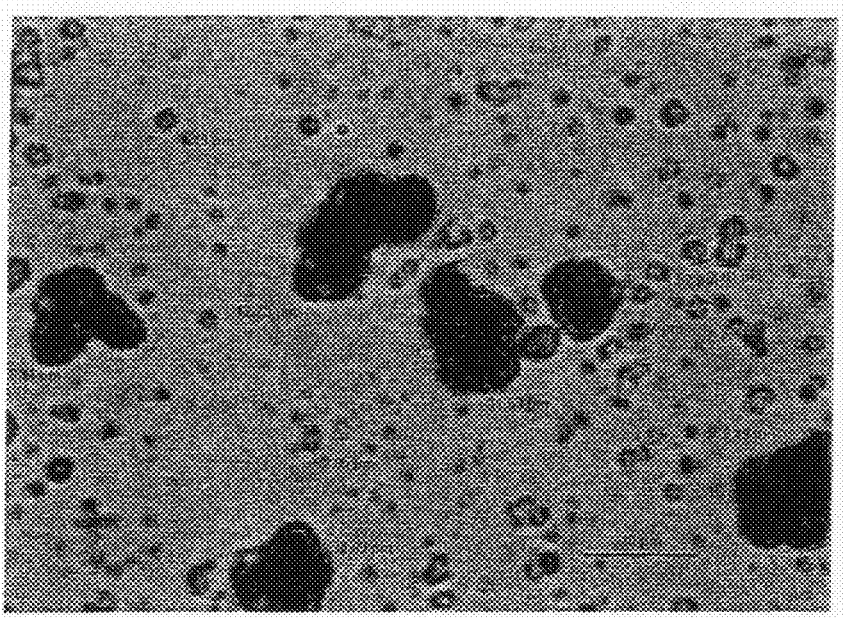
Figure 4: Graphite particles coated with the inventive polymer

PROCESS FOR PREPARING A BLOCK COPOLYMER FROM POLYIMIDES AND USE OF THE BLOCK COPOLYMER FOR PRODUCING POWDERS AND MOULDINGS

RELATED APPLICATIONS

This application is the U.S. National Stage of International Application No. PCT/EP2006/006840, filed Jul. 13, 2006, published in German, and claims priority under 35 U.S.C. §365 to German Application No. 10 2005 034 969.2, filed Jul. 22, 2005.

The invention relates to a process for preparation of pulverulent polyimide-polyimide block copolymers and of compounded materials produced therefrom, which can be pressed by means of direct forming processes and hot compression moulding processes to give moulded products.

DE 699 13 969 (3M) relates to a process for preparation of porous calcined polyimide. The porosity of the moulded plastics product permits use of doping to adapt the physical properties of the moulded plastics product, e.g. dielectric constant. The pores are generated via thermal decomposition of polyethylene glycol.

DE 697 28 384 (Teijin) describes a composition which encompasses a non-crystalline polyimide and encompasses an aromatic polyester. The polyimide serves for improvement of the properties of the polyester, e.g. mouldability and impermeability to gases.

U.S. Pat. No. 5,773,559 (Japan Synthetic Rubber Co.) describes the preparation of a block copolymer composed of two different polyamidecarboxylic acid units, where the first polyamidecarboxylic acid unit is formed from a tetracarboxylic acid and from a diamine and the first polyamidecarboxylic acid unit has free amino end groups, and the second polyamidecarboxylic acid unit is likewise formed from a tetracarboxylic acid and from a diamine and the second polyamidecarboxylic acid unit has free carboxylic acid end groups, and these two different polyamidecarboxylic acid units are reacted to give the polyamidecarboxylic acid block copolymer. After imidation, a polyimide block copolymer is obtained. The process can also be carried out analogously with polyimide block copolymers and then leads to the higher-molecular-weight polyimide block copolymer without additional imidation step. The process can moreover be carried out with diisocyanates as capped amines, and the process can likewise be carried out with polyamides and with polyimides. The polyimide block copolymers formed are in dissolved form after the imidation step and have to be precipitated in a further step. The block copolymers obtained in this way are used in liquid crystal formulations.

High-temperature polyimides (softening point>300° C.) are commercially available in the form of powders or mouldings. The products VESPEL® (a durable high-performance polyimide-based polymer (or plastic)) from DuPont, MELDIN® (a high-performance polyimide polymer) 7000 from Saint Gobain, PLAVIS® (a high-performance polyimide-based polymer and plastic) from Daelim and UPIMOL® (a heat-resistant polyimide polymer) from UBE are only obtainable in the market in the form of mouldings, whereas the product P84® (a aromatic backbone only polyimide polymer) is marketed as powder by HP Polymer. This powder is used by the company Ensinger to produce Sintimid mouldings with the trademark SINTIMID® (a high-performance polyimide-based plastic). The first 3 products are chemically identical, and are prepared from pyromellitic dianhydride and 4,4'-diaminodiphenyl ether. UPIMOL® (a heat-resistant polyimide polymer) is prepared from biphenyltetracarboxylic dianhydride and diaminodiphenyl ether. P84® (a aromatic backbone only polyimide polymer) differs in its composition from the 3 first-mentioned materials and has a softening point. However, high viscosity above the glass transition temperature permits only processing by the hot compression moulding process, but not by injection moulding or extrusion.

All of the products have properties capable of further improvement:

by way of example P84® (a aromatic backbone only polyimide polymer) is not direct-formable at room temperature (the meaning of direct forming being production of a "green" product with application of high pressure (from 2000 to 10 000 bar at room temperature)), and the moulded products composed of P84® (a aromatic backbone only polyimide polymers are brittle and hard and are therefore not easily subjected to processes involving mechanical working; corners and edges easily break away; the surface is matt;

inclusions can easily be produced during sintering.

VESPEL® (a durable high-performance polyimide-based polymer (or plastic)) and its derivatives and UPIMOL® (a heat-resistant polyimide polymer) have the following disadvantages:

the powder is not available on the open market, the semifinished product can be produced by the hot isostatic pressing process, and production is therefore complicated and expensive, and the production process is believed to be a complicated multistage process.

In the light of the prior art discussed, with its disadvantages, an object was then to provide a polyimide powder, and a process for its preparation, which is hot-compression-mouldable, whose glass transition temperature is more than 320° C. (measured value=peak maximum of tan δ from dynamic mechanical measurement in 3-point flexing mode at 1 Hz)

which performs better than SINTIMID® (a high-performance polyimide-based plastic) in processes involving mechanical working (higher notch impact resistance, better surface quality, smaller edge radii, higher speed in mechanical processes involving milling, turning or drilling), where the product should permit sintering without gas bubbles and without inclusions, where shaping processes that can be used are to include the direct forming process, where the surface of the resultant moulded plastics product is to have high quality, and where the edges of the moulded plastics product are to have small curvature radii and are not to break away.

The powder produced according to the process of the invention, and the compounded materials formed therefrom, achieve these objects and other objects not explicitly mentioned.

The objects are achieved via a process of claim 1, by preparing a pulverulent polyimide-polyimide block copolymer of the formula (I), having a particle size d50 of from 0.4 to 70 μm and having a structure composed of the following structural units:

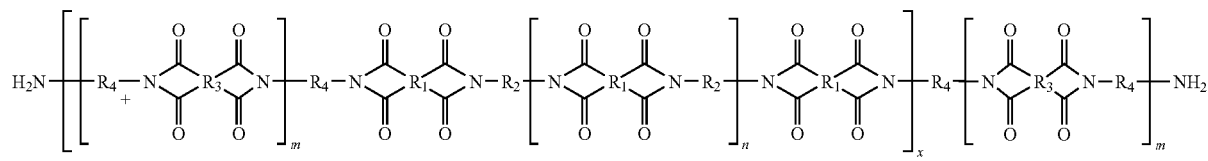
(I)
where: n and m=from 2 to 20,
x=from 1 to 300, and where
$R_1$ and $R_3$ are defined as follows:
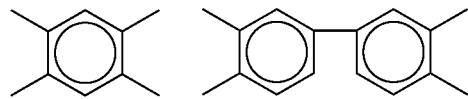
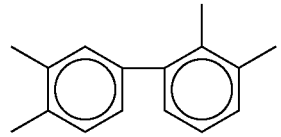
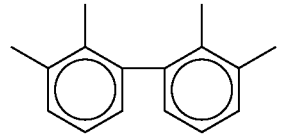
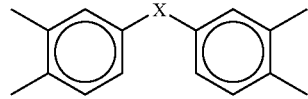
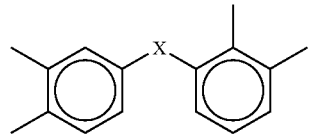
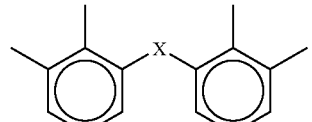
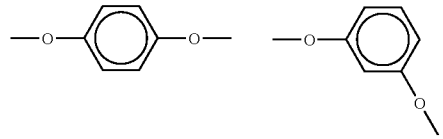
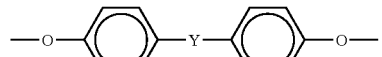
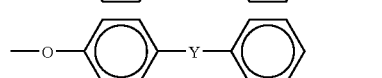
-continued
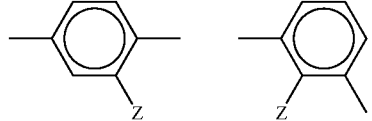
and $R_2$ and $R_4$ are defined as follows:
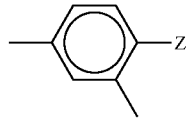
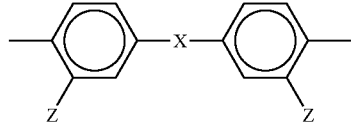
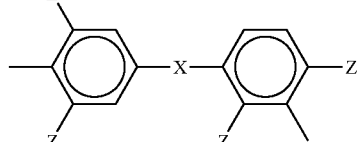
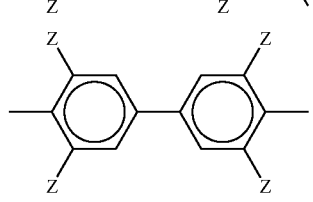
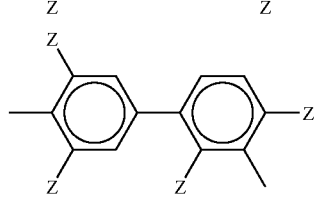
where Z=H, $CH_3$, $CF_3$, $OCH_3$
where X = —$CH_2$— —$SO_2$— —C(=O)—

-continued

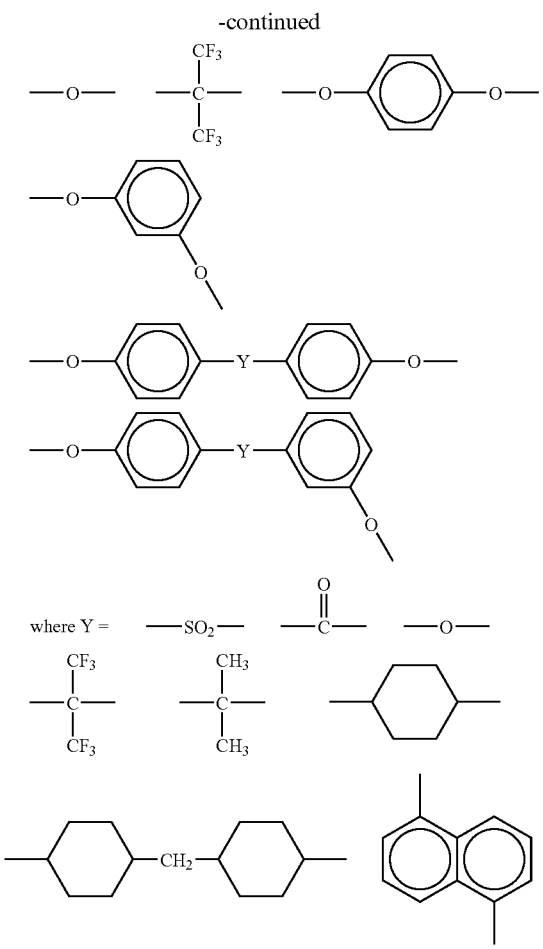

where n'=from 1 to 12 with the proviso that $R_1$ and $R_3$, and $R_2$ and $R_4$, may not simultaneously have the same meaning.

Preferred radicals $R_1$ and $R_3$ are as follows:

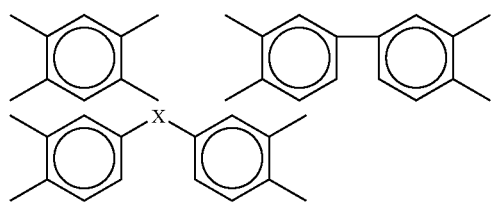

where X=—CO—.

Preferred radicals $R_2$ and $R_4$ are as follows:

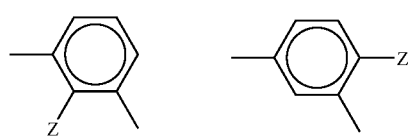

-continued

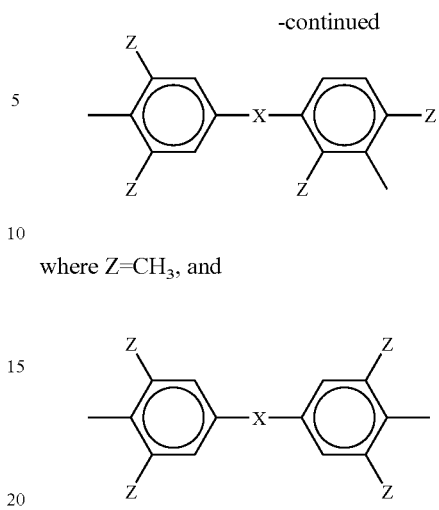

where $Z=CH_3$, and

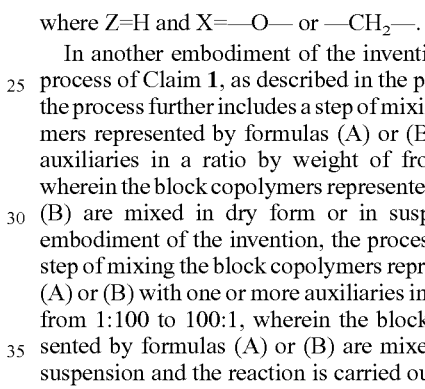

where Z=H and X=—O— or —$CH_2$—.

In another embodiment of the invention, in addition to a process of Claim 1, as described in the preceding paragraph, the process further includes a step of mixing the block copolymers represented by formulas (A) or (B) with one or more auxiliaries in a ratio by weight of from 1:100 to 100:1, wherein the block copolymers represented by formulas (A) or (B) are mixed in dry form or in suspension. In another embodiment of the invention, the process further includes a step of mixing the block copolymers represented by formulas (A) or (B) with one or more auxiliaries in a ratio by weight of from 1:100 to 100:1, wherein the block copolymers represented by formulas (A) or (B) are mixed in dry form or in suspension and the reaction is carried out in the presence of additional auxiliaries and the resultant block copolymer of formulas (A) or (B) is permitted to encapsulate the additional auxiliaries. In another embodiment of the invention, the process further includes a step of mixing the block copolymers represented by formulas (A) or (B) with one or more auxiliaries in a ratio by weight of from 1:100 to 100:1, wherein the block copolymers represented by formulas (A) or (B) are mixed in dry form or in suspension and the reaction is carried out in the presence of additional auxiliaries and the resultant block copolymer of formulas (A) or (B) is permitted to encapsulate the additional auxiliaries, and the thickness of the block copolymer encapsulating the auxiliary is from 0.1 µm to 10 µm. In another embodiment of the invention, in addition to a process of Claim 1, the process further including the steps of: (e) pressing the pulverulent polyimide-polyimide block copolymers of formula (I) at high pressures of from 2000 to 10 000 bar at from 0° C. to 200° C. to a density of greater than 1.20 g/ml, thereby directly forming a moulding; and (f) sintering the material obtained in step (e) above its glass transition temperature at atmospheric pressure. In another embodiment, the process of step (e) takes place at the temperature from 10° C. to 100° C. Alternatively, the process of step (e) takes place at the temperature from 20° C. to 0° C. In another embodiment of the invention, in addition to a process of Claim 1, the process further including the steps of: (e) pressing the pulverulent polyimide-polyimide block copolymers of formula (I) at pressures of from 100 to 1000 bar above the glass transition temperature until complete sintering occurs, thereby producing moulding by hot compression.

Block 1 with the radicals $R_1$ and $R_2$ has a softening point which permits processing the block copolyimide by the hot compression moulding process and at the same time allows the material to have higher stiffness and mechanical strength. The softening point is determined via determination of modulus of elasticity by means of dynamic mechanical measurement. The reduction in modulus of elasticity is intended to be so great that the pressure applied for a certain application time is adequate to permit achievement of shaping in the hot compression moulding process.

Block 2 with the radicals $R_3$ and $R_4$ is composed of an insoluble polyimide with no softening point and at the same time absorbs the energy of impact stress and of mechanical working.

The preparation process and the coupling of the individual blocks can take place in various ways.

Block Copolymer Preparation Process 1:

In this process, in block 1 a soluble polyimide having terminal anhydride groups is prepared by way of the isocyanate route. Block 2 is composed of a polyamide acid with terminal amines. These two blocks can react with one another and form a polyimide-polyamide acid block copolymer.

Block Copolymer Preparation Process 1, Preparation of Block 1:

For preparation of the first block, an aromatic tetracarboxylic dianhydride or a mixture composed of, two or more tetracarboxylic dianhydrides is reacted with an aliphatic or aromatic diisocyanate or a mixture composed of two or more diisocyanates in an aprotic dipolar solvent at from about 50° C. to 150° C. to give an oligomeric soluble polyimide which has dicarboxylic anhydrides as end groups. A basic catalyst is used here if appropriate, e.g. tertiary aromatic amines, alkali metal hydroxides or alkaline earth metal hydroxides or alkali metal alkanolates or alkaline earth metal alkanolates or a mixture composed of the above-mentioned compounds. Examples of aprotic dipolar solvents are inter alia N,N-dimethylformamide, N,N-dimethylacetamide, N-methylpyrrolidone or a mixture composed of the solvents listed above.

This reaction gives block 1 having the general structural formula (II):

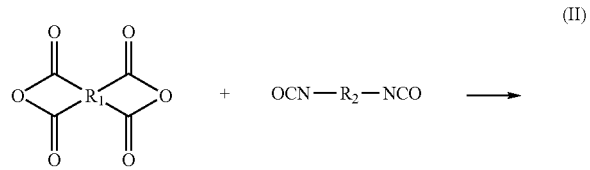

(II)

-continued

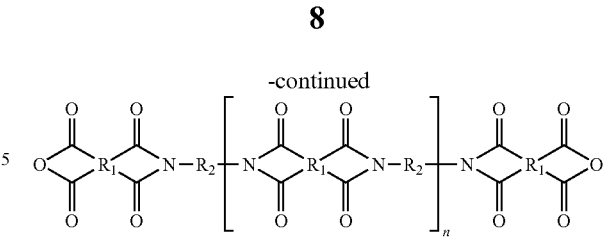

in which $R_1$, $R_2$ and n are as defined above.

Block Copolymer Preparation Process 1, Preparation of Block 2:

For preparation of the second block, an aromatic tetracarboxylic dianhydride or a mixture composed of two or more tetracarboxylic dianhydrides is reacted with an aliphatic or aromatic diamine or a mixture composed of two or more diamines in an aprotic dipolar solvent, such as N,N-dimethylformamide, N,N-dimethylacetamide or N-methylpyrrolidone at from about 0° C. to 30° C. to give an oligomeric soluble polyamidecarboxylic acid of the formula (III) which has amines as end groups.

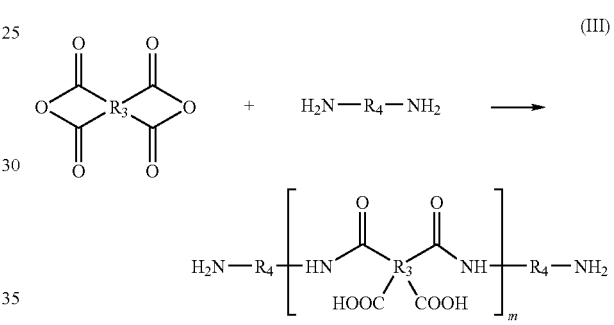

(III)

$R_3$, $R_4$ and m are as defined above.

Preparation of High-Molecular-Weight Polyimide-Polyamidecarboxylic Acid Block Copolymer, Process 1:

The solution of block 1 (formula II) is added to the solution of the oligomeric block 2 having amino end groups (formula III). The anhydrides still free here in block 1 react with the amines still free here in block 2 to give a high-molecular-weight polyimide-polyamide acid block copolymer of the general formula (IV). An important factor here is that the number of free amino end groups is the same as that of free carboxylic anhydride end groups, in order to permit achievement of high molar mass.

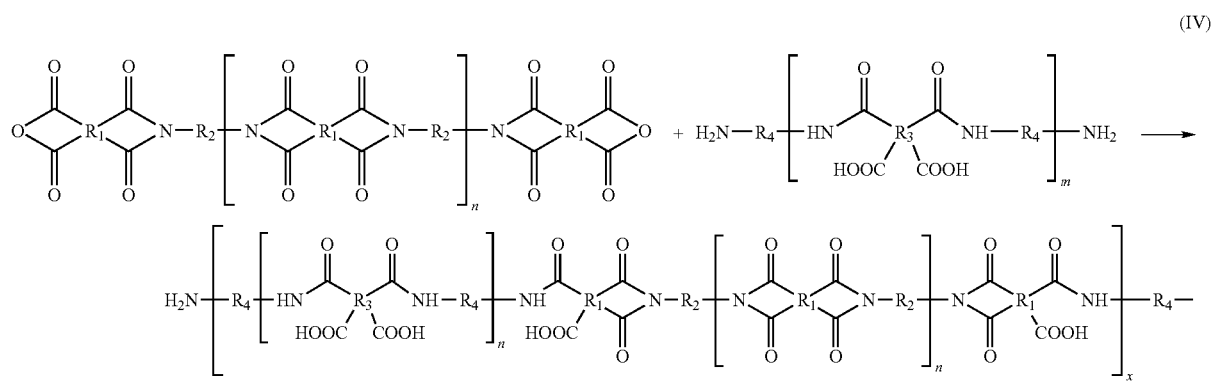

(IV)

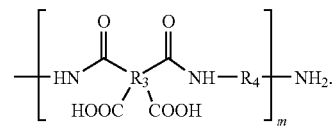

In the formula (IV) the radicals $R_1$, $R_2$, $R_3$ and $R_4$ and m, n and x are as defined above.

The block lengths and the percentage composition of the blocks here can vary. n and m can vary in the range from 2 to 20, and the molar block 1:block 2 ratio here can be from 10:90 to 90:10.

Block Copolymer Preparation Process 2:

Unlike in process 1, in process 2 the block 1 prepared also takes the form of polyamidecarboxylic acid having amino end groups. As in process 1, the block 2 prepared takes the form of a polyamidecarboxylic acid having amino end groups. Once the two solutions have been combined, an aromatic dianhydride or a mixture composed of two or more tetracarboxylic dianhydrides is added in order to couple the two blocks.

Block Copolymer Preparation Process 2, Preparation of Block 1:

For preparation of the first block, an aromatic tetracarboxylic dianhydride or a mixture composed of two or more tetracarboxylic dianhydrides is reacted with an aliphatic or aromatic diamine or a mixture composed of two or more diamines in an aprotic dipolar solvent at from about 0° C. to 30° C. to give an oligomeric soluble polyamidecarboxylic acid of the formula (V) which has amines as end groups.

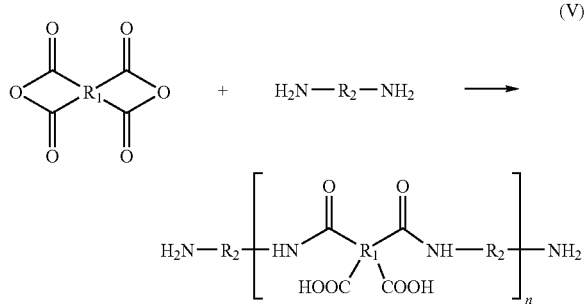

$R_1$, $R_2$ and n in the formula are as defined above.

Block Copolymer Preparation Process 2, Preparation of Block 2:

For preparation of the second block, an aromatic tetracarboxylic dianhydride or a mixture composed of two or more tetracarboxylic dianhydrides is reacted with an aliphatic or aromatic diamine or a mixture composed of two or more diamines in an aprotic dipolar solvent at from about 0° C. to 30° C. to give an oligomeric soluble polyamidecarboxylic acid of the formula (VI) which has amines as end groups.

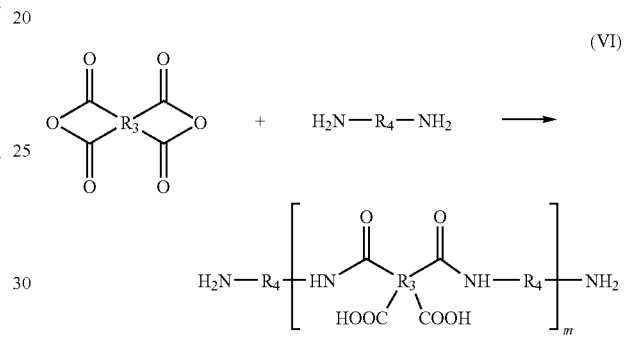

$R_3$ and $R_4$ and m in the formula are as defined above.

Process 2: Preparation of High-Molecular-Weight Poly-Amidecarboxylic Acid-Polyamidecarboxylic Acid Block Copolymer The solution of the oligomeric block 1 having amino end groups (formula V) and that of the oligomeric block 2 having amino end groups (formula VI) are combined. The blocks are coupled via addition of an aromatic tetracarboxylic dianhydride or of a mixture composed of two or more tetracarboxylic dianhydrides. Here, the amines still free in blocks 1 and 2 react with the tetracarboxylic anhydride or with the mixture composed of two or more tetracarboxylic dianhydrides to give a high-molecular-weight polyamidecarboxylic acid-polyamidecarboxylic acid block copolymer of the formula VII. An important factor here is that the number of free amino end groups is the same as that of the dicarboxylic anhydride groups, in order to permit achievement of high molar mass.

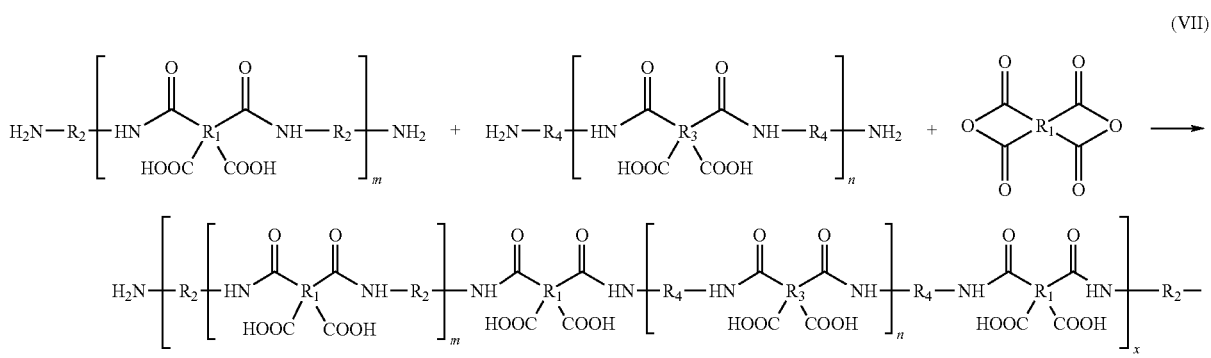

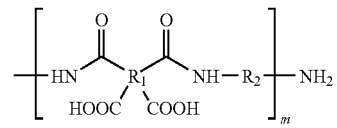

$R_1$, $R_2$, $R_3$ and $R_4$ and n, m and x are defined as above.

The block lengths and the percentage composition of the blocks here can vary. n and m can vary in the range from 2 to 20, and the molar block 1:block 2 ratio here can be from 10:90 to 90:10.

This process cannot of course ensure that a strictly alternating block copolymer of A-B type is obtained.

Instead, there will a random distribution of the blocks here. (e.g. AA-B-A-BBB-AAA-)

Block Copolymer Preparation Process 3:

Unlike in process 2, in process 3 the block 1 prepared takes the form of a polyamidecarboxylic acid having dicarboxylic anhydride end groups. As in processes 1 and 2, the block 2 prepared takes the form of a polyamidecarboxylic acid having amino end groups. The solution of block 1 is added to the solution of block 2. The anhydride groups of block 1 here react with the amines of block 2 to give a polyamidecarboxylic acid-polyamidecarboxylic acid block copolymer.

Block Copolymer Preparation Process 3, Preparation of Block 1:

For preparation of the first block, an aromatic tetracarboxylic dianhydride or a mixture composed of two or more tetracarboxylic dianhydrides is reacted with an aliphatic or aromatic diamine or a mixture composed of two or more diamines in an aprotic dipolar solvent at from about 0° C. to 30° C. to give an oligomeric soluble polyamidecarboxylic acid of the formula VIII which has dicarboxylic anhydrides as end groups.

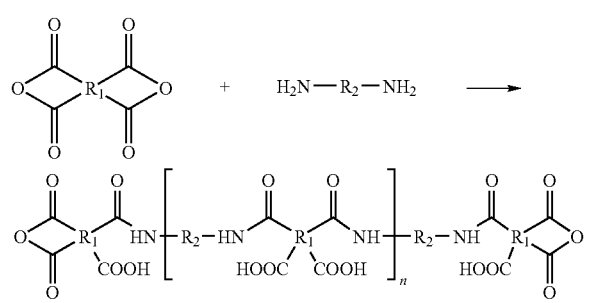

$R_1$, $R_2$ and n are as defined above.

Block Copolymer Preparation Process 3, Preparation of Block 2:

For preparation of the second block, an aromatic tetracarboxylic dianhydride or a mixture composed of two or more tetracarboxylic dianhydrides is reacted with an aliphatic or aromatic diamine or a mixture composed of two or more diamines in an aprotic dipolar solvent at from about 0° C. to 30° C. to give an oligomeric soluble polyamidecarboxylic acid of the formula IX which has amines as end groups.

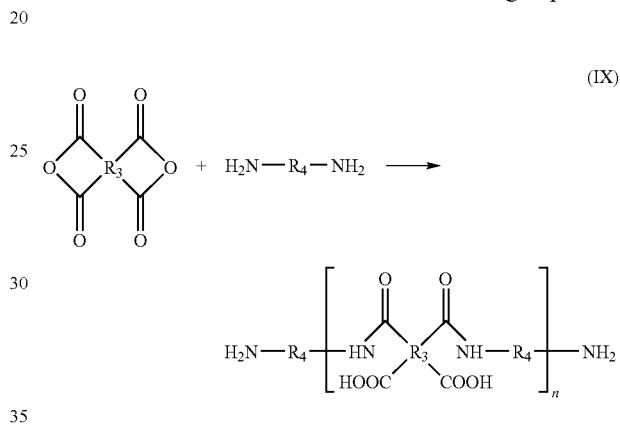

$R_3$, $R_4$ and m are as defined above.

Block Copolymer Preparation Process 3, Preparation of High-Molecular-Weight Polyamidecarboxylic Acid-Polyamidecarboxylic Acid Block Copolymer:

The solution of the oligomeric block 1 having dicarboxylic anhydride end groups (formula VIII) and that of the oligomeric block 2 having amino end groups (formula IX) are combined. The blocks are coupled via the reaction of the free anhydride end groups of block 1 with the free amine end groups of block 2. A high-molecular-weight polyamidecarboxylic acid-polyamidecarboxylic acid block copolymer of the formula X forms. An important factor here is that the number of free amino end groups is the same as that of dicarboxylic anhydride groups, in order to permit achievement of high molar mass.

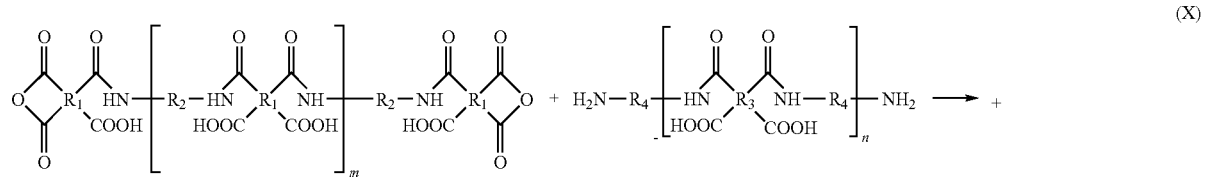

-continued

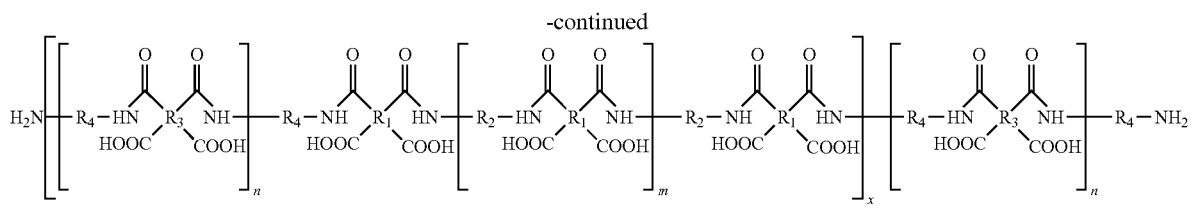

$R_1$, $R_2$, $R_3$ and $R_4$ and n, m and x are as defined above.

The block lengths and the percentage composition of the blocks here can vary. m and n can vary in the range from 2 to 20, and the molar block 1:block 2 ratio here can be from 10:90 to 90:10. This process gives a strictly alternating block copolymer of A-B type.

Imidation

The polyamidecarboxylic acid portion of the high-molecular-weight polyamidecarboxylic acid-polyimide block copolymer or, respectively, polyamidecarboxylic acid-polyamidecarboxylic acid block copolymer as in any of the processes 1 to 3 then has to be converted to a polyimide. This is brought about via a polymer-analogous reaction in a boiling aprotic dipolar solvent. Solvents can be, inter alia, N,N-dimethylformamide, N,N-dimethylacetamide or N-methylpyrrolidone. This reaction forms the imide from the amidecarboxylic acid with elimination of water and the material here becomes insoluble and precipitates from the solution. The boiling point here has to be from 140° C. to 210° C., preferably from 145° C. to 180° C. and very particularly preferably from 150° C. to 170° C. The polyamidecarboxylic acid block polymers are introduced with stirring into the boiling aprotic dipolar solvent. This comprises an anhydrous acid as catalyst, in order to catalyze the imidation reaction. It is preferable to use anhydrous mineral acids, such as phosphoric acid or benzenephosphonic acid.

Once the imidation reaction has started, the block copolyimide of the following formula I precipitates in the form of a fine deposit having a particle size d50 of from 0.4 to 7 µm. A precondition for this is that one of the blocks is an insoluble polyimide, resulting in precipitation of the entire block copolyimide. The water of imidation produced during the reaction is preferably removed from the system via simple continuous distillation. There is no requirement here for any entrainer giving a ternary boiling mixture with water, e.g. toluene or xylene. The amount of solvent drawn off from the system is sufficient to give constant content of the reactor even with continuous feed of polyamidecarboxylic acid block copolymer solution. Unlike batch operation (heating of a polyamidecarboxylic acid in a solvent to the boiling point), continuous addition produces only a small amount of water per unit of time, and this amount can readily and rapidly be removed from the system via distillation. This method markedly suppresses hydrolysis of the polyamidecarboxylic acid via the water of imidation. Furthermore, the reaction conditions could be described as dilute, because there is always only a small amount of polyamidecarboxylic acid block copolymer in solution. Very small particles (<10µ) can therefore be produced. No grinding process is therefore needed. Once addition is complete and any time for continued reaction has expired, the suspension is cooled and worked up. The polyimide-polyimide block copolymer formed has the following structural formula I:

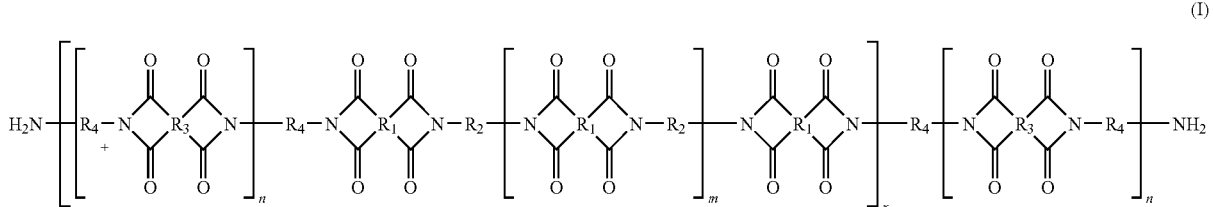

(I)

$R_1$, $R_2$, $R_3$ and $R_4$ and n, m and x are as defined above.

Work-Up, Drying and Conditioning

After the imidation process, the powder is present in a suspension comprising solvent. The powder has to be freed from the solvent and from the catalyst. One route consists in evaporation of the solvent via spray drying and subsequent extraction of the powder with water to remove the catalyst. Another route consists in the displacement of solvent and catalyst via a dilution wash. In this process, the suspension is mixed with water and filtered. The resulting filter cake or the concentrated suspension is again mixed with water and again filtered. The procedure is repeated until washing has removed the solvent and the catalyst. Examples of filter materials that can be used are metal gauze, glass frits, textile filters and membranes, but these are not exclusive. The powder suspension or the wet filter cake is then dried by conventional drying methods, non-exclusive examples of which are thin-film evaporators, spray dryers, spray granulators, drying cabinets, horizontal dryers, vertical dryers or heatable suction-filter funnels. After drying, the material then has to be heated to at least 250° C. in order firstly to achieve complete post-imidation and secondly to ensure removal of volatile constituents. Otherwise these would cause difficulties in the subsequent hot compression moulding process.

The powder prepared in accordance with the process of the invention is direct-formable, and can also be processed by the hot compression moulding process. The powder obtained in accordance with Example 4 has the following properties:

| Property | Unit | |
|---|---|---|
| Bulk density | kg · l$^{-1}$ | >0.45 |
| d50 particle size | μm | 4 |
| Size of agglomerates | μm | 300-630 |
| Weight loss, 355° C., 3 hours | % | <0.2* |
| Adsorbed water | % | <0.7 |

*ignoring water

A moulded product was produced by the hot compression moulding process from a polyimide-polyimide block copolymer prepared according to Example 4. The moulded product has the following properties (in the unfilled state):

| Property | Test method | Unit | Value |
|---|---|---|---|
| Glass transition temperature T$_g$ | Dynamic mechanical thermal analysis (Peak-maximum of tan δ, 1 Hz, heating rate 2° C./min) | ° C. | 370 |
| Tensile strength | ISO 527 | MPa | 107 |
| Tensile strain at break | ISO 527 | % | 3.7 |
| Tensile modulus | ISO 527 | MPa | 3400 |
| Flexural strength | ISO 178 | MPa | |
| 23° C. | | | 177 |
| 200° C. | | | 136 |
| Flexural strain at break | ISO 178 | % | |
| 23° C. | | | 6.1 |
| 200° C. | | | 8.2 |
| Flexural modulus | ISO 178 | MPa | |
| 23° C. | | | 3750 |
| 200° C. | | | 3090 |
| Density | DIN 53479 | kg · l$^{-1}$ | 1.38 |
| Shore D hardness | DIN 53505 | — | 90 |
| Rockwell hardness | IS02039-2 "E" | RH | E 94 |
| Charpy notch impact resistance | ISO 179-1/1eA | kJ · m$^{-2}$ | 5.9 |
| Charpy impact resistance | ISO 179-1/1eU | kJ · m$^{-2}$ | 40 |
| Heat distortion temperature | 1.8 MPa Method Af | ° C. | 325 |
| Linear coefficient of thermal expansion 50-200° C. | DIN 53752 | 10$^{-6}$ · K$^{-1}$ | 54 |
| Linear coefficient of thermal expansion 200-300° C. | | 10$^{-6}$ · K$^{-1}$ | 61 |
| Specific heat | | J · g$^{-1}$ · K$^{-1}$ | 0.925 |
| Thermal conductivity | ISO8302 at 40° C. | W · m$^{-1}$ · K$^{-1}$ | 0.22 |
| Dielectric strength DC | ISO 60243-1 | kV · mm$^{-1}$ | 21.8 |
| Dielectric constant | IEC60250 | — | |
| 100 Hz | | | 4.2 |
| 1 kHz | | | 4.2 |
| 10 kHz | | | 4.1 |
| 100 kHz | | | 4.1 |

Comparison with Materials According to the Prior Art

A moulded product produced by the hot compression moulding process and composed of a polyimide-polyimide block copolymer prepared according to the process of the invention has the following improved properties in comparison with SINTIMID® (a high-performance polyimide-based plastic) and VESPEL® (a durable high-performance polyimide-based polymer (or plastic)):

Mechanical strength properties are superior to those of VESPEL® (a durable high-performance polyimide-based polymer (or plastic)). Flexural strength at 177 MPa is markedly higher than that of VESPEL® (a durable high-performance polyimide-based polymer (or plastic)) at 110 MPa. There is also an improvement in the stiffness of the material (inventive polymer: 3750 MPa, VESPEL® (a durable high-performance polyimide-based polymer (or plastic)): 3100 MPa). Charpy notch impact resistance (5.9 kJ/m$^2$) is also markedly superior to that of VESPEL® (a durable high-performance polyimide-based polymer (or plastic)) (3.5 kJ/m$^2$). In comparison with SINTIMID® (a high-performance polyimide-based plastic), there is a marked improvement in machining performance. Treatment of the semifinished inventive polymer product can be markedly quicker, with better edge quality and better surface quality. This becomes clear via images of semifinished products subjected to mechanical working and composed of SINTIMID® (a high-performance polyimide-based plastic) ("P84 HT") and of the polyimide-polyimide block copolymer prepared according to the process of the invention ("P84 NT" in the recorded image) in FIG. 1, FIG. 2 and FIG. 3. The polyimide-polyimide block copolymer prepared according to the process of the invention can be worked mechanically at high speed without break-away of the edges (see comparison in FIG. 3) with high surface quality (formation of grooves during turning in FIG. 1, whereas with SINTIMID® (a high-performance polyimide-based plastic) the result is merely break-away of material from the surface, see FIG. 2.

FIG. 1 shows the face side and edge of a surface subjected to mechanical working by means of turning on a moulding produced from the polymer prepared according to the process of the invention;

FIG. 2 shows the face side and edge of a surface subjected to mechanical working by means of turning on a moulding produced from SINTIMID® (a high-performance polyimide-based plastic) (P84 HT);

FIG. 3 shows the surface and edge of a surface subjected to mechanical working by means of milling on a moulding produced from the polymer prepared according to the process of the invention (P84 NT, below) and SINTIMID® (a high-performance polyimide-based plastic) (P84 HT, above);

FIG. 4 shows graphite particles coated with the polymer prepared according to the process of the invention.

PROCESS FOR PREPARING COMPOUNDED MATERIALS

In principle, it is possible to use any of the additives which withstand the hot compression moulding process without adverse effect. Non-exclusive examples of fillers that can be used are: polytetrafluoroethylene, graphite, molybdenum disulphide, boron nitride, metal oxides, carbon fibres and glass fibres, calcium carbonate, barium sulphate, metals, silicon dioxide and mixtures composed of the above-mentioned substances. The amount of filler or filler mixture can be from 1% to 99%, based on the amount of the polymer.

There are 3 different possible methods for preparing the compounded materials.

Process 1:

In this process, the filler is introduced before the imidation step is complete. Prior to the start of the imidation process, the filler is suspended in the boiling solvent. Solvents that can be used are the abovementioned aprotic, polar solvents, such as N,N-dimethylformamide, N,N-dimethylacetamide, N-methylpyrrolidone, individually or in mixtures. Indeed, in the case of some fillers (e.g. graphite, molybdenum disulphide, carbon fibres) the imidation process results in coating with the inventive polymer. This improves adhesion between filler and matrix and increases the mechanical strengths of the compounded materials. See FIG. 4 as example.

Process 2:

Once the polymer suspension has been freed from the solvent and from the catalyst, the filler can be stirred into the aqueous suspension. The isolation and drying processes described at an earlier stage above produce a very homogeneous compounded material.

Process 3:

A powder is obtained after drying of the polymer suspension. The filler can be added to this powder in a suitable dry mixer. A large amount of shear has to be introduced to achieve good mixing, thus breaking down any aggregates.

EXAMPLES

Example 1

Preparation of Block 1 by Process 1

24 kg of N,N-dimethylformamide and 7.0 kg (21.73 mol) of benzophenonetetracarboxylic dianhydride are placed in a stirred reactor with exclusion of moisture at room temperature. 25 g (0.245 mol) of 1,4-diazabicyclo-[2.2.2]octane and 5 ml of water are added to this suspension. The reaction mixture is then heated to about 80° C. Once all of the solids have dissolved, 3.290 kg (17.38 mol) of Lupranat™ VP9227 (commercially available mixture composed of 4,4'-diisocyanatodiphenylmethane, toluene 2,6-diisocyanate and toluene 2,4-diisocyanate) are metered in at a constant conveying rate. The carbon dioxide produced here is discharged by way of the condenser. Once the isocyanate feed has ended, the reaction mixture is permitted to continue reaction and is then cooled.

Example 2

Preparation of Block 2 by Process 1

47 kg of N,N-dimethylformamide are placed in a reactor and cooled to about 10° C. 3.770 kg (18.85 mol) of 4,4'-diaminodiphenyl ether are then dissolved. 3.000 kg (13.75 mol) of pyromellitic dianhydride are then added in portions.

Example 3

Preparation of Polyimide-Polyamidecarboxylic Acid Block Copolymer by Process 1

The solution of block 1 from Example 1 is pumped, with stirring, into the solution prepared in Example 2 and comprising block 2. The reactor in which block 1 was prepared is flushed with 13 kg of N,N-dimethylformamide, and the flushing solution is likewise added to the solution of block 2. Pyromellitic dianhydride, dissolved in dimethylformamide, is then metered in until the desired viscosity is achieved. The temperature here is always held at 10° C. The viscosity of this polyamide acid-polyimide block copolymer solution is about 40 Pas at 25° C.

Example 4

Preparation of Polyimide-Polyimide Block Copolymer from the Polyamidecarboxylic Acid-Polyimide Block Copolymer 100 kg of N,N-dimethylformamide and 1 kg of 85% strength phosphoric acid are used as initial charge in a stirred, heatable reactor equipped with a packed rectification column with a condenser on top of the column, and are heated to boiling. 200 kg of polyamidecarboxylic acid-polyimide block copolymer solution from Example 3 are introduced continuously into the mixture. By way of the column and the condenser, sufficient solvent is removed from the system to keep the liquid level constant in the reactor. After a short time, a polyimide deposit forms. Once the feed has ended, the mixture is cooled. This gives about 30 kg of polyimide powder in suspension.

Example 5

Preparation of Block 1 by Process 3

24 kg of N,N-dimethylformamide and 7.0 kg (21.73 mol) of benzophenonetetracarboxylic dianhydride are placed in a stirred reactor, with exclusion of moisture at room temperature. Once a solution has been produced, a mixture composed of 1.372 kg of 2,4-diaminotoluene, 0.342 kg of 2,6-diaminotoluene and 0.696 kg of 4,4'-diaminodiphenylmethane is added in portions. Once the addition has ended, the reaction mixture is permitted to continue reacting.

Example 6

Preparation of Polyamidecarboxylic Acid-Polyamidecarboxylic Acid Block Copolymer by Process 3

The solution of block 1 from Example 5 is pumped, with stirring, into the solution prepared in Example 2 and comprising block 2. The reactor in which block 1 was prepared is flushed with 13 kg of N,N-dimethylformamide, and the flushing solution is likewise added to the solution of block 2. Pyromellitic dianhydride, dissolved in dimethylformamide, is then metered in until the desired viscosity is achieved. The temperature here is always held at 10° C. The viscosity of this polyamidecarboxylic acid-polyamidecarboxylic acid block copolymer solution is about 40 Pas at 25° C.

The invention claimed is:

1. A process for preparation of particles of a pulverulent polyimide-polyimide block copolymer of the formula (I):

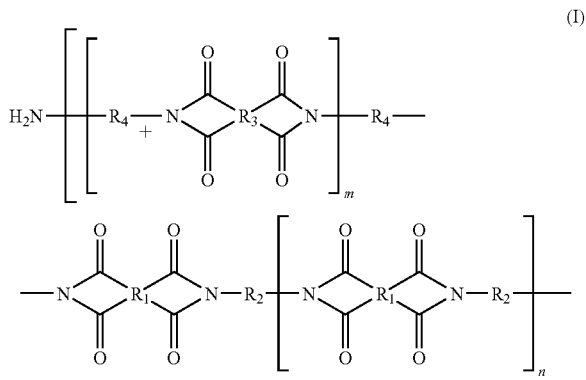

-continued

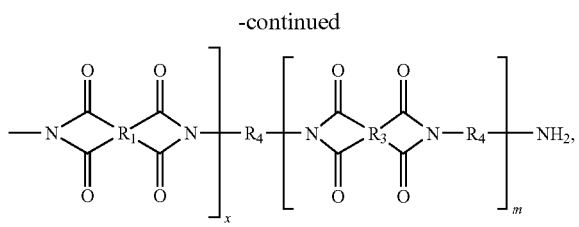

said process comprising the steps of:
(i) continuously passing into a boiling aprotic dipolar solvent a solution of a polyimide-polyamidecarboxylic acid block copolymer having the following structure:

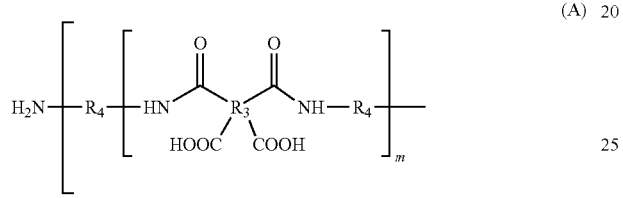

(A)

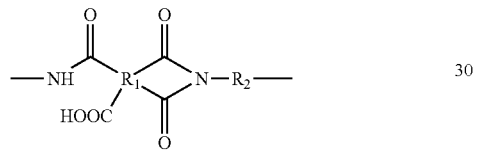

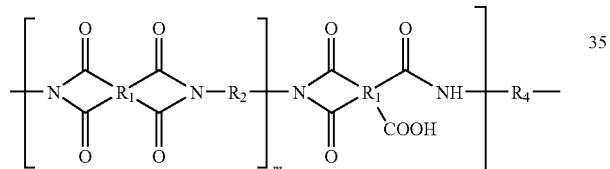

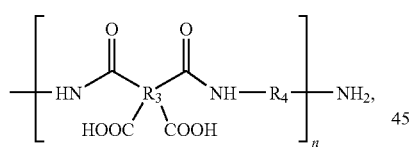

or a solution of a polyamidecarboxylic acid-polyamidecarboxylic acid block copolymer, having the following structure:

(B)

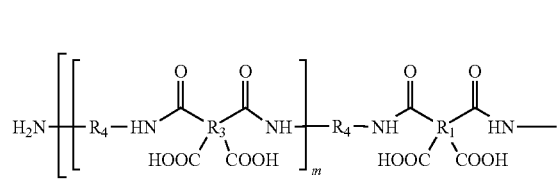

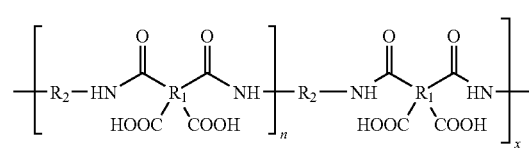

-continued

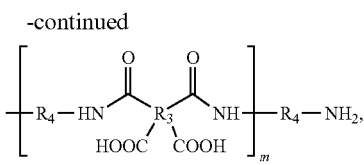

(ii) converting the polyamidecarboxylic acid portion of the block copolymers represented by formulas (A) or (B) into an insoluble polyimide-polyimide block copolymer via thermal imidation and water elimination;

(iii) precipitating the insoluble polyimide-polyimide block copolymer; and (iv) removing the resulting water from the reaction mixture, wherein:
n and m=from 2 to 20;
x=from 1 to 300;
$R_1$ and $R_3$ are defined as follows:

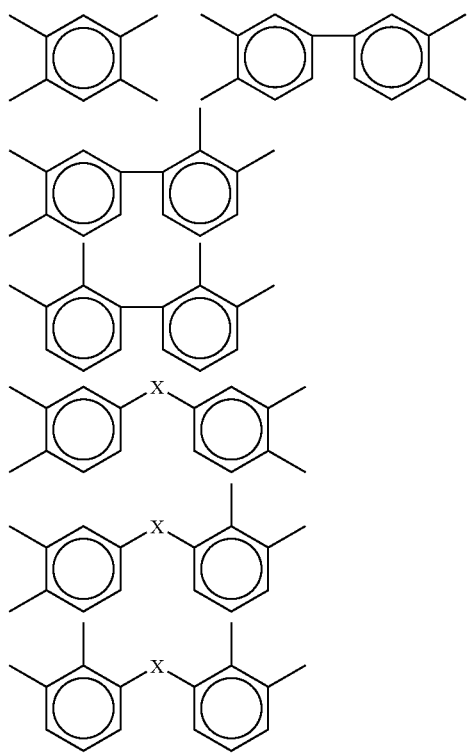

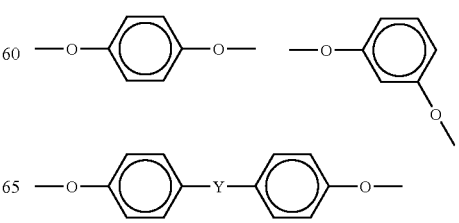

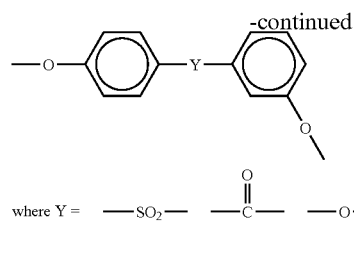

$R_2$ and $R_4$ are defined as follows:

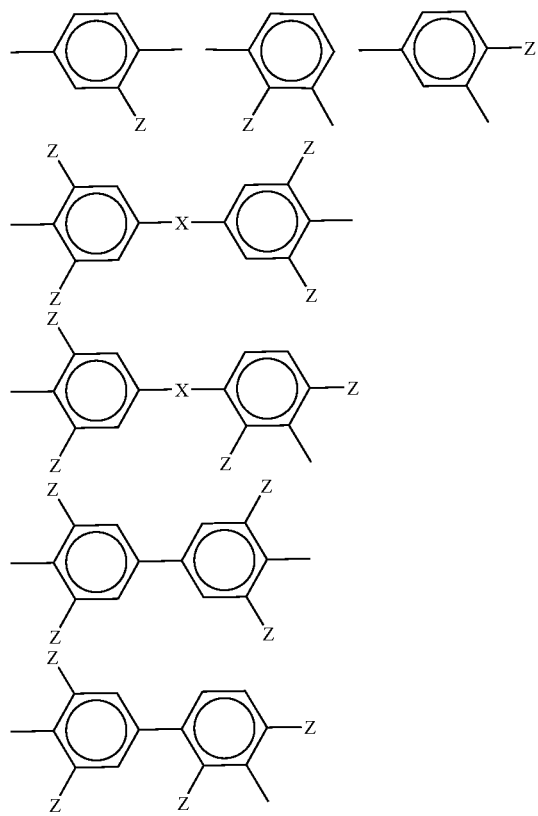

where Z = H, CH$_3$, CF$_3$, OCH$_3$

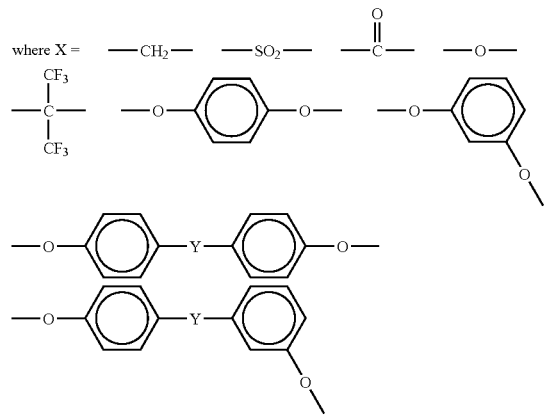

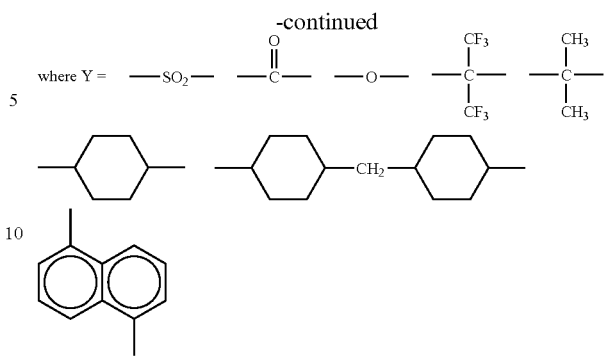

—C$_{n}$H$_{2n'}$—;

n' is from 1 to 12;

with the proviso that $R_1$ and $R_3$, and $R_2$ and $R_4$, may not simultaneously take the same values, and further wherein said particles have particle size d50 of from 0.4 to 70 μm.

2. The process of claim 1, wherein the boiling aprotic dipolar solvent is N,N-dimethylformamide, N,N-dimethylacetamide, N-methylpyrrolidone or a mixture thereof.

3. The process claim 1, wherein an anhydrous acid is used as catalyst for the imidation reaction.

4. The process of claim 1, further including a step of mixing the block copolymers represented by formulas (A) or (B) with one or more auxiliaries in a ratio by weight of from 1:100 to 100:1, wherein the block copolymers represented by formulas (A) or (B) are mixed in dry form or in suspension.

5. The process of claims 4, wherein the reaction is carried out in the presence of additional auxiliaries and the resultant block copolymer of formulas (A) or (B) is permitted to encapsulate the additional auxiliaries.

6. The process of claim 5, wherein the thickness of the block copolymer encapsulating the auxiliary is from 0.1 μm to 10 μm.

7. The process of claim 1, further including the steps of:

(e) pressing the pulverulent polyimide-polyimide block copolymers of formula (I) at high pressures of from 2000 to 10 000 bar at from 0° C. to 200° C. to a density of greater than 1.20 g/ml, thereby directly forming a moulding; and (f) sintering the material obtained in step (e) above its glass transition temperature at atmospheric pressure.

8. The process of claim 7, wherein step (e) takes place at the temperature from 10° C. to 100° C.

9. The process of claim 8, wherein step (e) takes place at the temperature from 20° C. to 50° C.

10. The process of claim 1, further including the steps of:

(e) pressing the pulverulent polyimide-polyimide block copolymers of formula (I) at pressures of from 100 to 1000 bar above the glass transition temperature until complete sintering occurs, thereby producing moulding by hot compression.

11. A method for production of moulded plastic products, comprising preparing particles according to the process of claim 1, and molding said particles.

* * * * *